United States Patent [19]
Solimar

[11] Patent Number: 5,819,970
[45] Date of Patent: Oct. 13, 1998

[54] PNEUMATIC VESSELS FOR TRAILERS AND METHODS OF ASSEMBLY

[76] Inventor: Keith F. Solimar, 1289 Brighton Sq., New Brighton, Minn. 55112

[21] Appl. No.: 601,236

[22] Filed: Feb. 14, 1996

[51] Int. Cl.⁶ .................................................. B65D 90/02
[52] U.S. Cl. ............................................ 220/1.5; 220/562
[58] Field of Search .................................... 220/562, 563, 220/564, 1.5

[56]    References Cited

U.S. PATENT DOCUMENTS

| | | | |
|---|---|---|---|
| 3,139,286 | 6/1964 | Johnson | 220/564 |
| 3,325,177 | 6/1967 | Welinder | 220/564 |
| 3,339,499 | 9/1967 | Charles et al. | 220/562 |
| 5,390,827 | 2/1995 | Toth et al. | 220/1.5 |

FOREIGN PATENT DOCUMENTS

| | | | |
|---|---|---|---|
| 530303 | 9/1957 | Belgium | 220/562 |
| 3048868 | 7/1982 | Germany | 220/562 |
| 406069 | 7/1966 | Switzerland | 220/562 |

OTHER PUBLICATIONS

J&L Tank brochure, entitled "On the Right Track!" copyright 1990, 12 pages.
The Heil Co. brochure, entitled "Heil® Super Flo™, A Tradition in Dry Bulk Transporation," copyright 1994, 4 pages.
The Heil Co. brochure, entitled "Heil® Super Jet, For profitable and efficient transporation of bulk materials," copyright 1989, 4 pages.
Modern Bulk Transporter, Oct., 1994, 4 pages including cover page and pp. 4, 67, and 119.
Modern Bulk Transporter, Jul., 1993, 4 pages including cover page and pp. 2, 4, and 11.
Standard Steel Works, Inc. portfolio of "Nordic Standard" pneumatic bulk transports, 15 pages.

Primary Examiner—Stephen J. Castellano
Attorney, Agent, or Firm—Merchant, Gould, Smith, Edell, Welter & Schmidt, P.A.

[57]    ABSTRACT

A pneumatic vessel is provided including a vessel wall of a metallic construction defining an enclosed shape with an interior for holding dry bulk material. The vessel wall includes first and second ends which each define a conical shape. An upper central section defines a cylindrical shape. A lower central section defines at least one unloading hopper. The seam between the upper central cylindrical section and the first and second conical sections is angled relative to the vertical axis. A manhole is provided to access an interior of the vessel. An aeration system may be provided to facilitate unloading of the dry bulk material. The vessel is part of a trailer for transporting the dry bulk material.

22 Claims, 10 Drawing Sheets

PNEUMATIC VESSELS FOR TRAILERS AND METHODS OF ASSEMBLY

FIELD OF THE INVENTION

The present invention relates to pneumatic vessels and trailers for handling dry bulk materials.

BACKGROUND OF THE INVENTION

Vessels are known for holding dry bulk materials for transport. Dry bulk materials include such items as flour, sugar, starch, fertilizer, plastic resins, cement, fly-ash, and other particulate materials. Typically the vessels are made of metal and are mounted on a trailer for transport between locations. The vessels are unloaded by use of a pneumatic system where the particulate exits the vessel under pressure. Aeration systems may be provided to aerate or fluidize the particulate to permit unloading.

With respect to the construction of the vessels, there are various concerns. The shape of the vessels is a concern so as to permit cost effective and easy manufacture. Complex shapes are difficult to form from sheet metal. The shape of the vessels is also a concern so that the vessels can be properly pressurized during use. Also, providing a shape so that the contents of the vessels properly empty during unloading is a concern.

One type of known vessel in a trailer construction includes an upper central section, generally cylindrical, and a lower central section having unloading hoppers through which the dry bulk material is emptied. End sections are tapered or cup-shaped and include a horizontal top surface and an angled lower surface. The end sections are welded to the upper and lower central sections. The joint defined by the seam between each end section and the upper central section is vertical. The use of the vertical seam at the joint between the upper central section and each end section causes the end sections to each have a complex curved shape. The end sections are such that no central axis is defined. The tapered and curved construction is non-conical in nature and is therefore difficult to manufacture, such as by conventional sheet metal rolling techniques. This is a significant concern in the case of manufacturing cost-effective pneumatic trailers.

Therefore, there is a need in the art for pneumatic vessels for trailers for dry bulk material handling which address the above concerns and other concerns.

SUMMARY OF THE INVENTION

A pneumatic vessel is provided which includes a vessel wall of a metallic construction defining an enclosed shape with an interior for holding dry bulk material. The vessel wall includes first and second ends which each define a conical shape. An upper central section defines a cylindrical shape where the upper central section connects the first end to the second end. A lower central section defines at least one unloading hopper. The lower central section connects to the upper central section and the first and second ends.

Preferably, the lower central section includes an aeration system including at least one aerator positioned through the wall. It is also preferred that the lower central section define at least one conical shape. The vessel may include one, two, three, or four conical shapes defining the unloading hoppers. Preferably the lower central section includes an unloading system which includes at least one valve mounted to the wall and a conduit extending from the valve to permit unloading under pressure. The vessel is preferably supported by a frame which is supported by a chassis of a trailer. The chassis further includes wheels, and a hitch which permits pulling of the trailer by a tractor. Preferably, the vessel also includes at least one manhole extending from the upper central section of the vessel wall permitting access to the interior of the vessel. Various angles for the conical shapes of the first and second ends are anticipated including 45° cones.

The present invention also relates to a pneumatic vessel including a first conical wall at one end of the vessel wherein the first conical wall has a top surface portion and a bottom surface portion. A second conical wall is positioned at an opposite end of the vessel wherein the second conical wall has a top surface portion and a bottom surface portion. A cylindrical wall forms an upper portion of the vessel wherein the cylindrical wall has a top surface portion. The first conical wall and the second conical wall are each joined to the cylindrical wall at an angled seam. The top surface portion of each of the first and second conical walls and the top surface portion of the cylindrical wall are collinear and extend parallel to a longitudinal axis of the vessel. The bottom surface portion of each conical wall extends at an angle to the direction of extension of the top surface portions. A lower hopper wall defines at least one unloading hopper and is joined to the first and second conical walls and to the cylindrical wall wherein an enclosed vessel is formed. Various angles for the conical walls are anticipated including 45° cones.

The present invention also relates to a method of assembly of a pneumatic vessel including the steps of forming first and second flat sheets of metal into conical shapes to each define a portion of a cone. A third sheet of metal is formed into a cylindrical shape to define a portion of a cylinder with two ends. The first conical sheet is welded to the third cylindrical sheet at the first end. The second conical sheet is welded to the third cylindrical sheet at the second end. At least one unloading hopper is welded to the first and second conical sheets and to the third cylindrical sheet thereby forming an enclosed pneumatic vessel.

Preferably, the conical shapes of the first and second flat sheets are formed by rolling. The method preferably includes adding a manhole to the third cylindrical sheet, an aerator to the unloading hopper, and a valve to the unloading hopper. Preferably, the vessel is attached to a trailer including a chassis which supports ground engaging wheels, and a frame which mounts the vessel to the chassis.

DETAILED DESCRIPTION OF THE PREFERRED EMBODIMENTS

Figure 1:
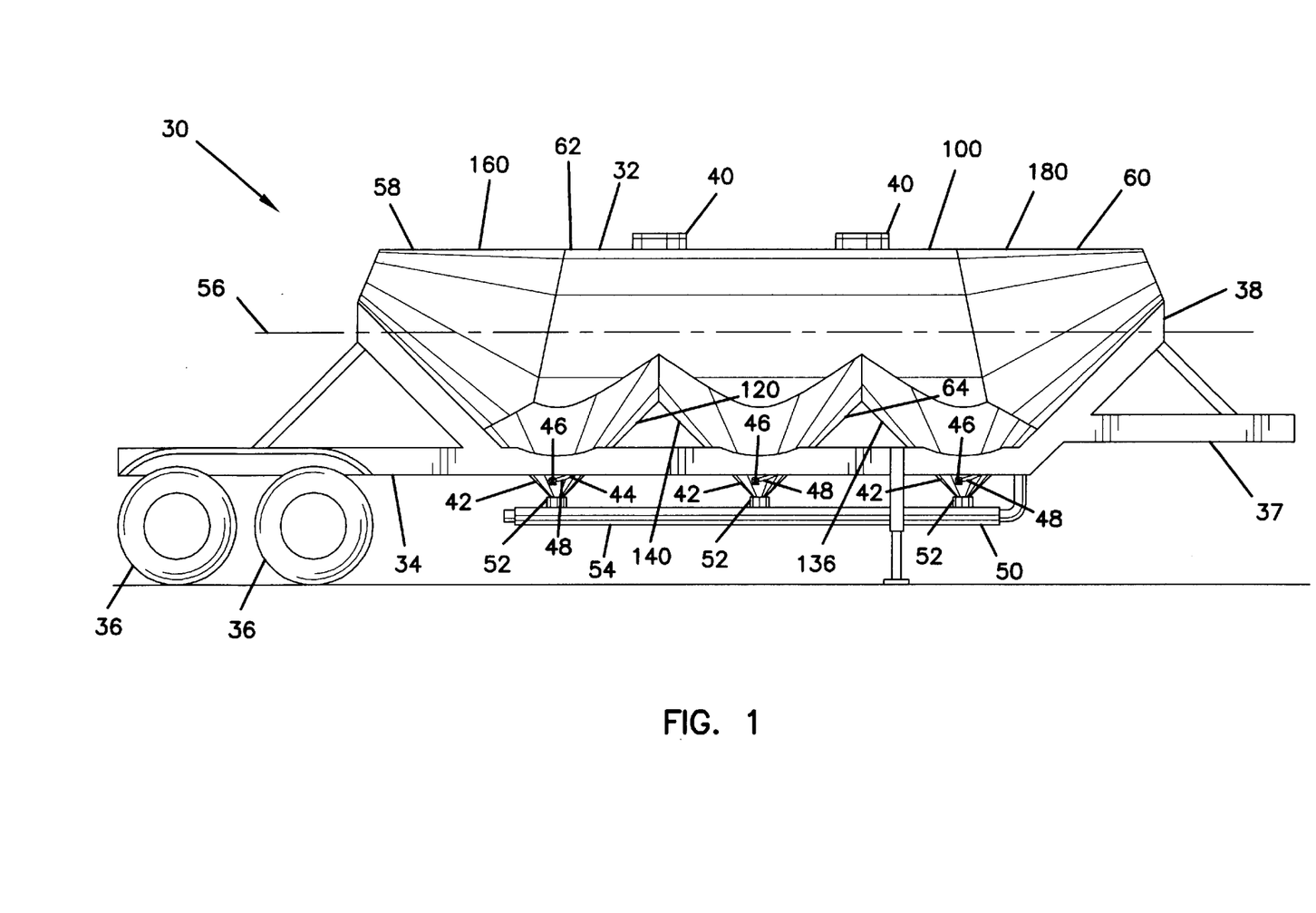
FIG. 1 is a side view of a first embodiment of a pneumatic trailer according to the present invention.

FIG. 1 shows a trailer 30 including an enclosed vessel 32 supported on a chassis 34 by a frame 38. Wheels 36 are mounted to chassis 34. A hitch 37 permits coupling of trailer 30 to a tractor for hauling of the trailer between locations. Vessel 32 defines an interior for receipt of dry bulk material.

Vessel 32 includes two manholes 40 which permit loading of material into vessel 32. An example manhole construction is shown in U.S. Pat. No. 5,366,317, the disclosure of which is hereby incorporated by reference. Manholes 40 also permit access to the interior of vessel 32, such as for cleaning or repair.

Vessel 32 includes a plurality of hoppers 42 for unloading the material from vessel 32. An aeration system 44 includes a plurality of aerators 46 connected by hoses 48. Aeration systems are shown for example in U.S. Pat. Nos. 5,381,606 and 4,662,543, the disclosures of which are hereby incorporated by reference. Aeration system 44 pressurizes vessel 32 during unloading and also fluidizes the dry bulk material to permit easier unloading.

An unloading system 50 associated with hoppers 42 controls the unloading operation. A manually operated valve 52 is located at a lower portion of each hopper 42. Operation of valve 52 allows access to an interior of vessel 32 to permit unloading. Unloading conduit 54 extends from valve 52 and carries unloaded material from vessel 32. Valve 52 and conduit 54 can be any conventional structures for pneumatic handling of dry bulk material in trailer vessels.

Trailer 30 generally defines a longitudinal axis 56, such as shown in FIG. 1. Vessel 32 is preferably made from a metallic material, such as aluminum about 0.20–0.25 inches thick. Steel can also be used, such as ³/₁₆ths of an inch thick. Vessel 32 can be any desired height, width and length suitable for over the road travel. Generally, the interior of vessel 32 is hollow, except for added interior supports which maintain vessel 32 in an operable condition and prevent damage during pressure loading. Vessel 32 is used for handling dry bulk material emptied into vessel 32 through one or more of manholes 40. After transport, the dry bulk material is unloaded via unloading system 50 by applying a positive pressure inside vessel 32. Aeration system 44 is utilized to add pressurized air to the interior of vessel 32. Pressures of 14.7 pounds per square inch gauge (p.s.i.g.) (U.S.) and 30 p.s.i.g. (other parts of the world) are typical. Aeration system 44 also utilizes aerators 46 to vibrate and fluidize the compacted dry bulk material. The source of pressurized air for the aeration system 44 can come from a blower package mounted to trailer 30. A filter can also be added if desired to filter the air used to unload and aerate vessel 32.

Referring now to FIGS. 1–4, vessel 32 generally includes a first end 58 and a second end 60 at an opposite end of vessel 32. An upper central section or region 62 is disposed between first and second ends 58, 60. A lower central section or region 64 forms the unloading hopper region. More specifically, vessel 32 includes a first end cone 160 at first end 58, and a second end cone 180 at second end 60. Lower central region 64 includes a first end hopper 120, a second end hopper 136 at an opposite end, and a middle hopper 140 positioned between first and second end hoppers 120, 136. Upper central region 62 is formed generally by a cylindrical section 100.

Figure 5:
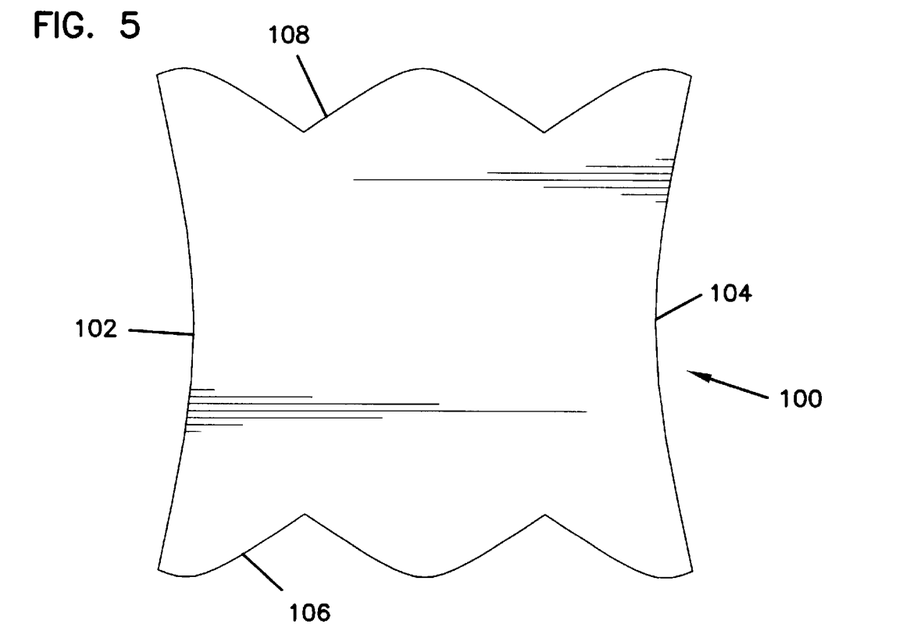
FIG. 5 is a flat layout of the cylindrical section of the pneumatic vessel of the first embodiment.
Figure 6:
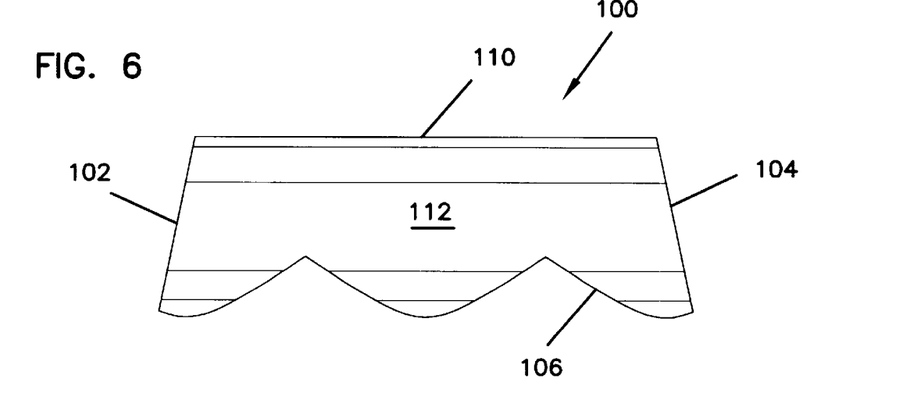
FIG. 6 is a side view of the cylindrical section.
Figure 7:
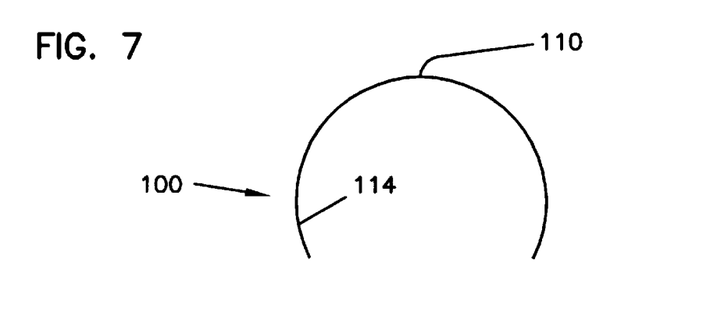
FIG. 7 is an end view of the cylindrical section.
Figure 8:
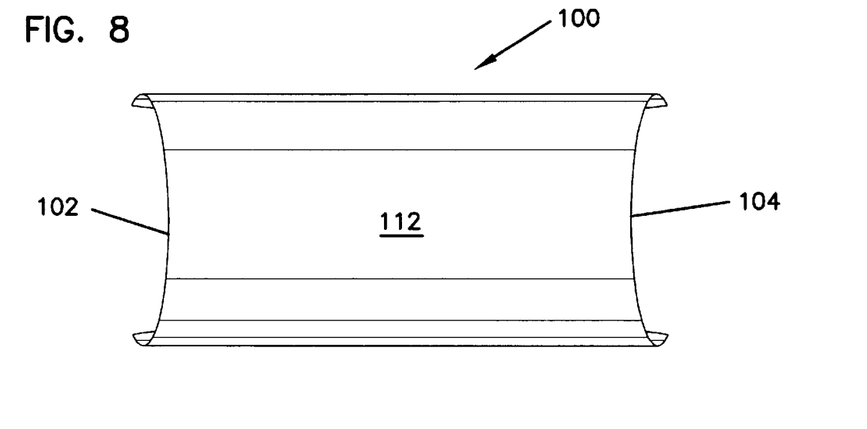
FIG. 8 is a top view of the cylindrical section.

FIGS. 5–8 show cylindrical section 100 in greater detail. FIG. 5 shows cylindrical section 100 in a flat layout. FIGS. 6–8 show cylindrical section 100 in its cylindrical shape as in vessel 32. Cylindrical section 100 includes first and second opposite curved edges 102, 104 for connecting to end cones 160, 180. Opposite undulating side edges 106, 108 connect cylindrical section 100 to hoppers 44. Cylindrical section 100 generally defines a top surface 110 at the uppermost portion of cylindrical section 100 in the orientations shown in FIGS. 6 and 7. Cylindrical section 110 includes a generally cylindrical outer surface 112 and a generally cylindrical inner surface 114.

Figure 9:
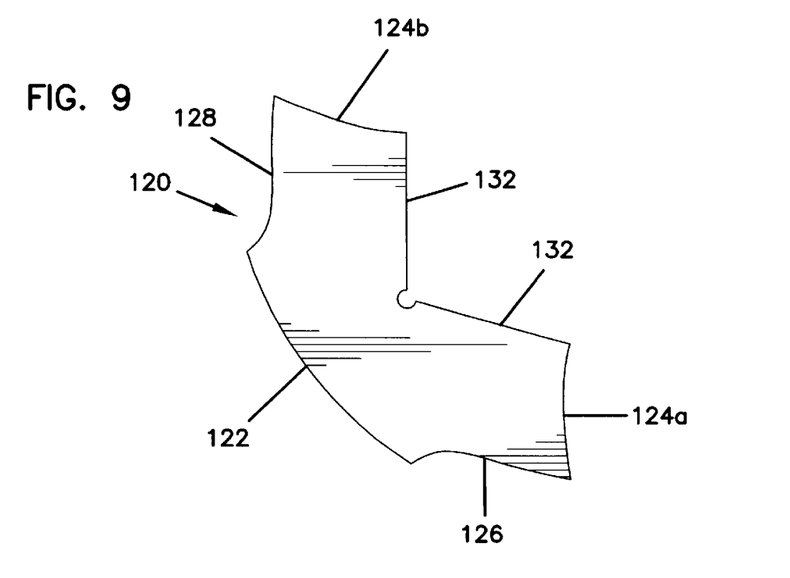
FIG. 9 is a flat layout of one end hopper of the pneumatic vessel of the first embodiment, the other end hopper having an identical construction.
Figure 10:
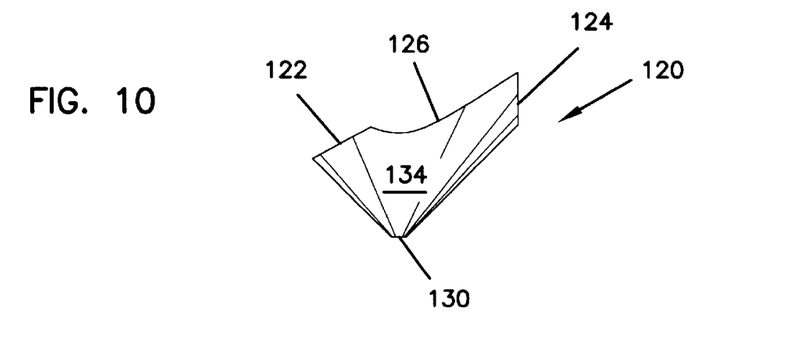
FIG. 10 is a side view of the end hopper.
Figure 11:
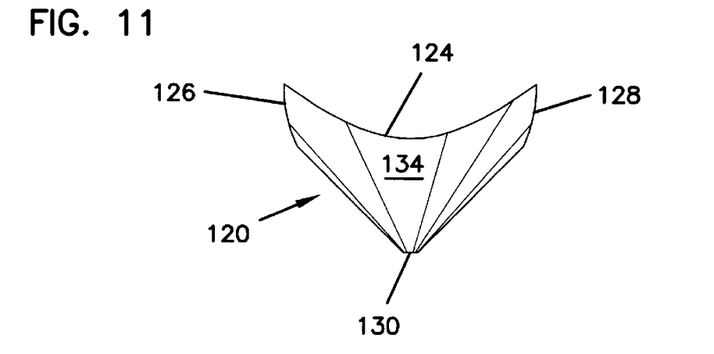
FIG. 11 is an end view of the end hopper.
Figure 12:
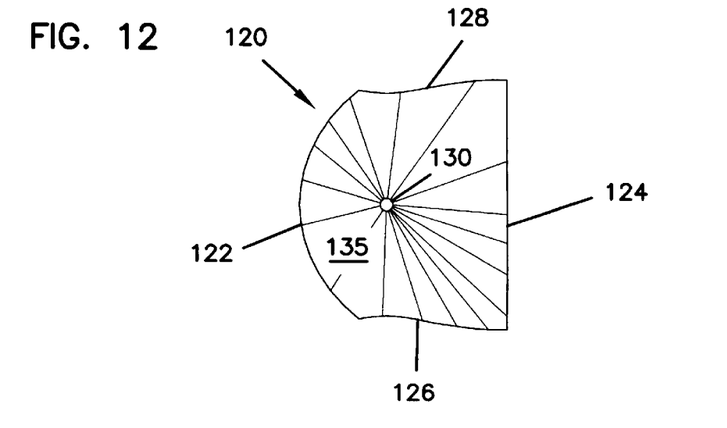
FIG. 12 is a top view of the end hopper.

Referring now to FIGS. 9–12, end hopper 120 is shown in greater detail. FIG. 9 shows end hopper 120 in a generally flat layout and showing a split seam 132, which could be at any location. FIGS. 10–12 show end hopper 120 in its conical configuration in vessel 32. End hopper includes a first edge 122 which connects to end cone 160. A second opposite edge 124 connects to middle hopper 140. Opposed side edges 126, 128 connect to cylindrical section 100. End hopper 120 includes an outlet opening 130, an outer conical surface 134, and an inner conical surface 135.

Figure 2:
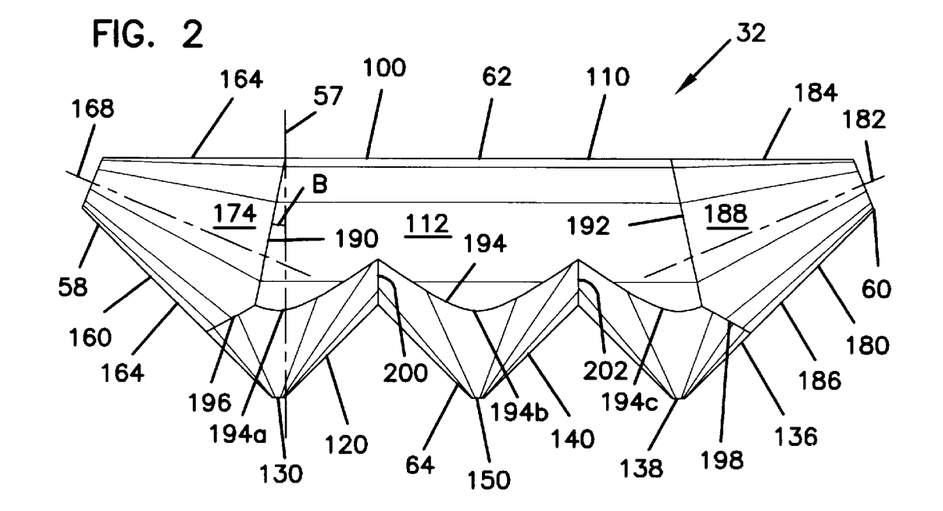
FIG. 2 is a side view of the pneumatic vessel of the first embodiment of the invention.
Figure 3:
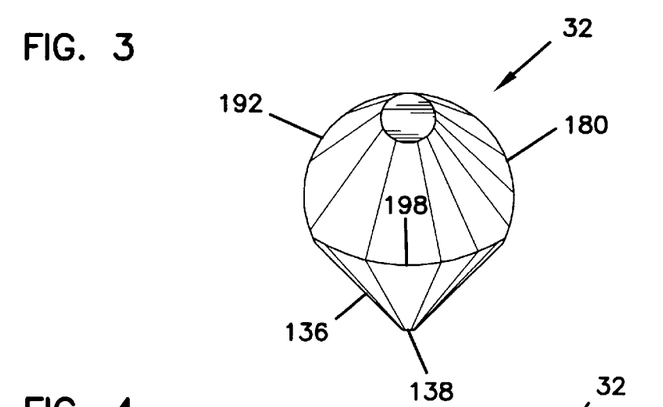
FIG. 3 is an end view of the pneumatic vessel of the first embodiment.
Figure 4:
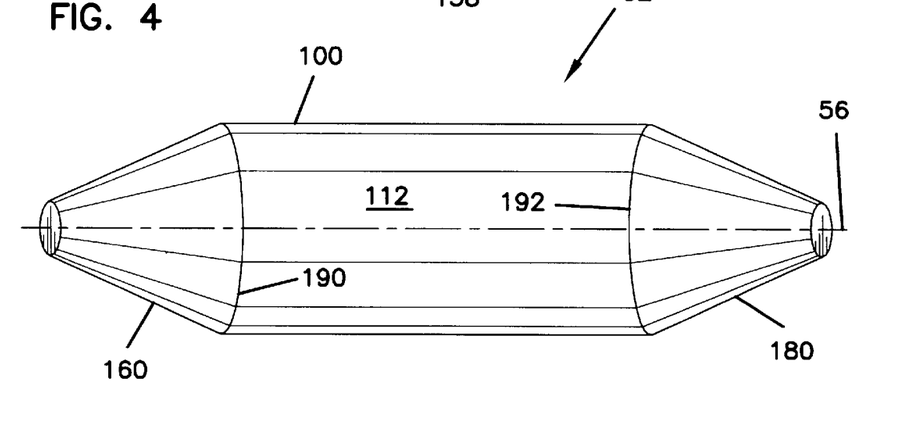
FIG. 4 is a top view of the pneumatic vessel of the first embodiment.

Second end hopper 136, shown in FIGS. 1–3, at an opposite end of vessel 32 has a generally identical configuration to first end hopper 120. End hopper 136 defines an outlet opening 138, as shown in FIGS. 2 and 3.

Figure 13:
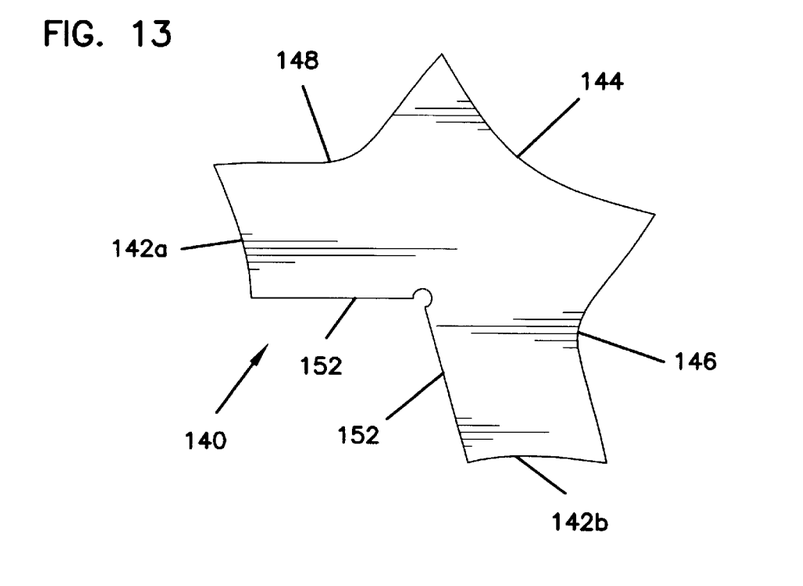
FIG. 13 is a flat layout of the middle hopper of the pneumatic vessel of the first embodiment.
Figure 14:
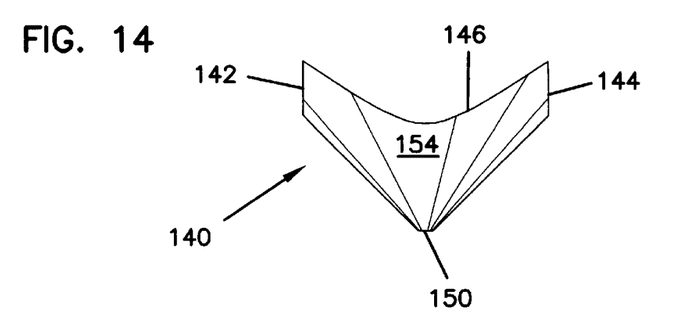
FIG. 14 is a side view of the middle hopper.
Figure 15:
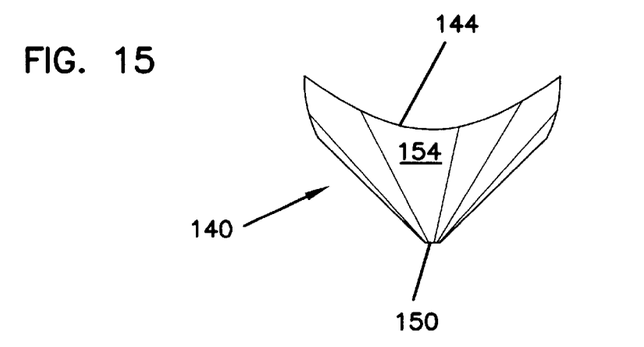
FIG. 15 is an end view of the middle hopper.
Figure 16:
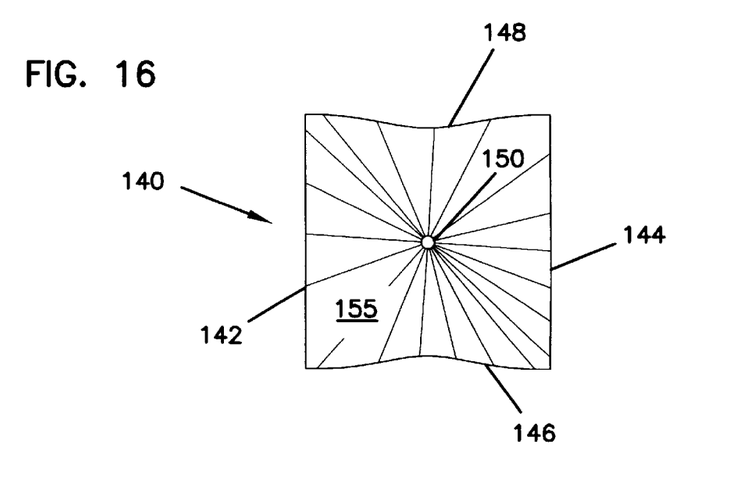
FIG. 16 is a top view of the middle hopper.

Referring now to FIGS. 13–16, middle hopper 140 is shown in greater detail. FIG. 13 shows middle hopper 140 in a flat layout, with a split seam 152 shown in one example location. Other locations are possible. FIGS. 14–16 show middle hopper 140 in its conical configuration as in vessel 32. First edge 142 connects to first end hopper 120. Opposite edge 144 connects to second end hopper 136. Opposed side edges 146, 148 connect to cylindrical section 100. Middle hopper 144 defines an outlet hole 150, and an outer conical surface 154, and an inner conical surface 155. While the preferred shape for end hoppers 120, 136 and middle hopper 140 is conical, other shapes can be utilized, if desired.

Figure 17:
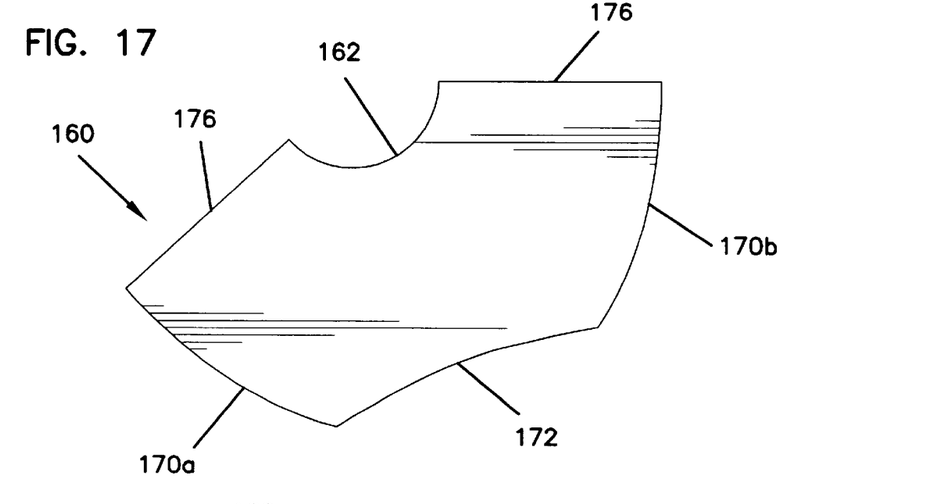
FIG. 17 is a flat layout of one end cone of the pneumatic vessel of the first embodiment, the other end cone having an identical construction.
Figure 18:
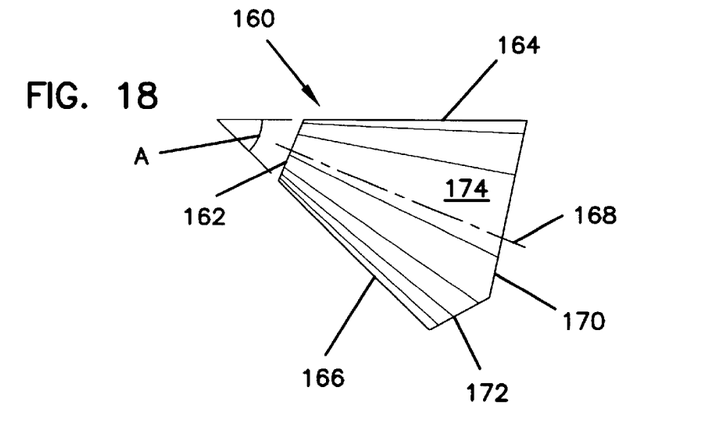
FIG. 18 is a side view of the end cone.
Figure 19:
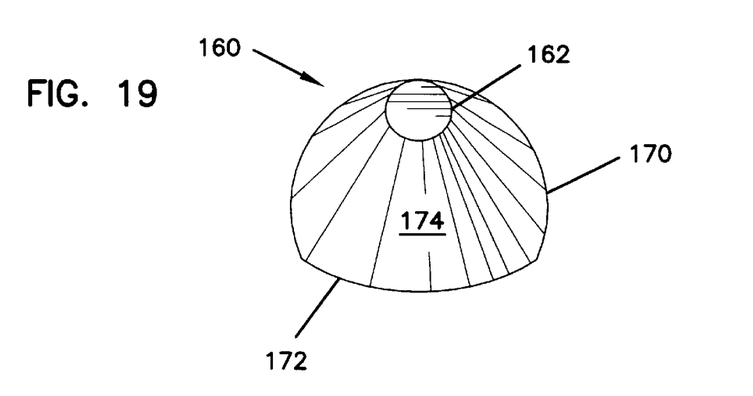
FIG. 19 is an end view of the end cone.
Figure 20:
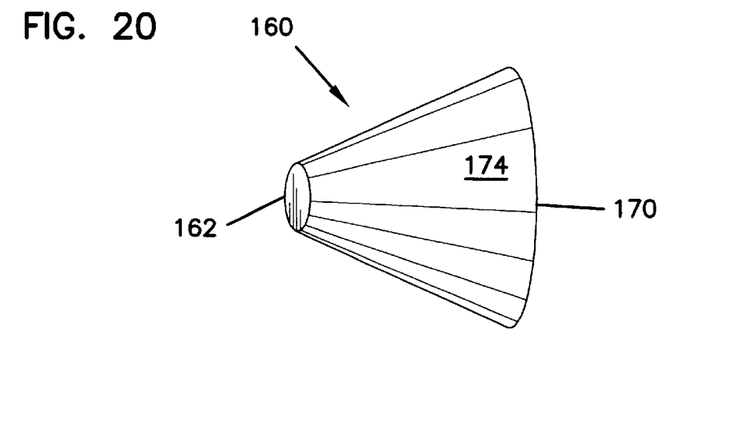
FIG. 20 is a top view of the end cone.

Referring now to FIGS. 17–20, first end cone 160 is shown in greater detail. FIG. 17 shows end cone 160 in a flat layout with split seam 176 shown in one example location. Other locations are possible. FIGS. 18–20 show first end cone 160 in its conical configuration as in vessel 32. First end cone 160 includes a planar angled end 162, a top surface 164, a bottom surface 166, and a central axis 168. First end cone 160 includes an outer conical surface 174 which is conical about axis 168. An inner surface (not shown) is also conical in shape about axis 168. A first edge 170 connects to cylindrical section 100. In FIG. 17, edges 170a and 170b come together at seam 176 to form edge 170 as shown in FIGS. 18–20. Second edge 172 connects to first end hopper 120. As shown in FIG. 18, bottom surface 166 is at an angle A relative to top surface 164. In the embodiment shown, angle A is at 45° and top surface 164 is horizontal to the ground. Other angles for angle A are possible, such as 50°, 60°, and 70°. If desired, other angles can be used as long as the angle is such that the particulate empties from vessel 32 during unloading.

Second end cone 180, shown in FIGS. 1–4, is constructed generally identical to first end cone 160. Second end cone 180 includes a central axis 182 defining the conical outer surface 188 having a conical configuration. Top surface 184 is generally horizontal, and bottom surface 186 is at a 45° angle. If angle A is varied from 45° in end cone 160, end cone 180 also preferably varies in a similar manner.

Referring again to FIGS. 2–4, components 100, 120, 136, 140, 160, and 180 of vessel 32 join at various seams or joints shown in FIGS. 2–4. First end cone 160 and cylindrical section 100 join at seam 190. Second end cone 180 and cylindrical section 100 join at second seam 192. Third seam 194 joins cylindrical section 100 to end hoppers 120, 136 and middle hopper 140. Specifically, seam 194a joins cylindrical section 100 to first end hopper 120. Seam 194b joins middle hopper 140 to cylindrical section 100. Seam 194c joins second end hopper 136 to cylindrical section 100. Fourth seam 196 joins first end cone 160 to first end hopper 120. Fifth seam 198 joins second end cone 180 to second end hopper 136. Sixth seam 200 joins first end hopper 120 with middle hopper 140. Seventh seam 202 joins second end hopper 136 with middle hopper 140.

Additional seams may be provided in each component, such as in the case of each component being made from several separate sheets of material welded or otherwise joined together. It is to be noted that the various seams shown in FIGS. 9, 13, and 17 are for illustration purposes and are optionally located in the areas shown. Other flat layout shapes are possible. In actual construction of vessel 32, the flat layout sheets may never physically exist in the flat state since each component 100, 120, 136, 140, 160, and 180 may be assembled from separate pieces individually bent, curved, rolled, or otherwise formed into the approximate necessary final shape needed to construct each component.

As shown in FIG. 2, seams 190, 192 are angled seams relative to top surfaces 110, 164, 184. The angle is the result of the mating of a generally perfect conical shape defined by end cones 160, 180 with a generally perfect cylindrical shape defined by cylindrical section 100. Each seam 190, 192 is positioned in a plane which is at a non-perpendicular angle to longitudinal axis 52 of vessel 32. The planes defined by each seam 190, 192 intersect due to the angled orientation of seams 190, 192. The resulting construction of vessel 32 is that top surfaces 110, 164, 184 are generally parallel and define the same line which is parallel to longitudinal axis 56. Bottom surfaces 164 and 186 are generally at a 45° angle relative to longitudinal axis 56 and the direction of extension of top surfaces 110, 164, 184. The intersection of a 45° cone and a cylindrical section define a specific angled seam. Seams 190, 192 are at 11.70220° (angle B) relative to a vertical axis 57. If angle A is different than 45°, then seams 190, 192 will be at a different angle relative to the vertical axis.

End cones 160, 180 have generally perfect conical shapes. The resulting construction of end cones 160, 180 is such that it is convenient to roll them from sheet metal since any section of either of end cones 160, 180 has a conical shape about either axis 168, 182, respectively. Conical shapes are easier to roll than are tapered non-conical curved shapes that have no single central axis. This is important in the case of cost effective manufacture. For example, less experienced workers can more easily shape end cones 160, 180 during manufacture.

Figure 21:
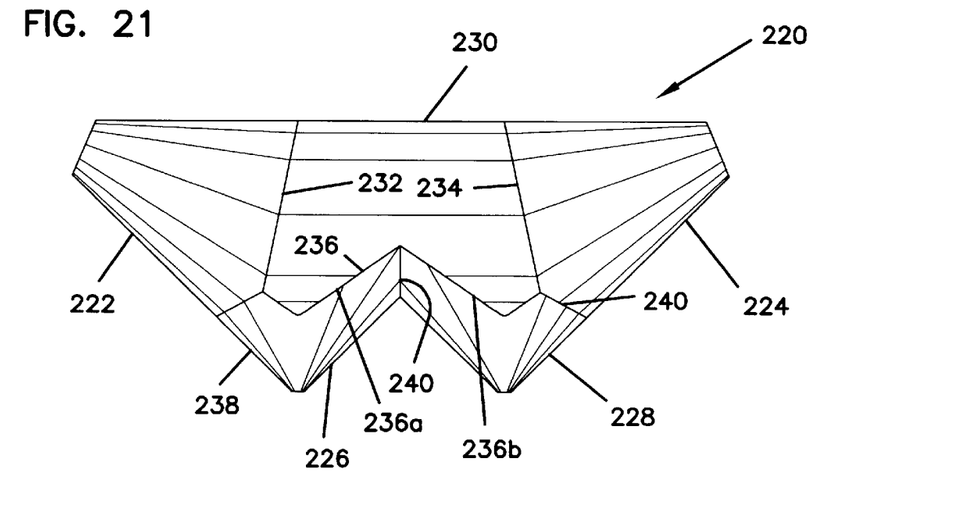
FIG. 21 is a side view of a second embodiment of a pneumatic vessel with two hoppers.
Figure 22:
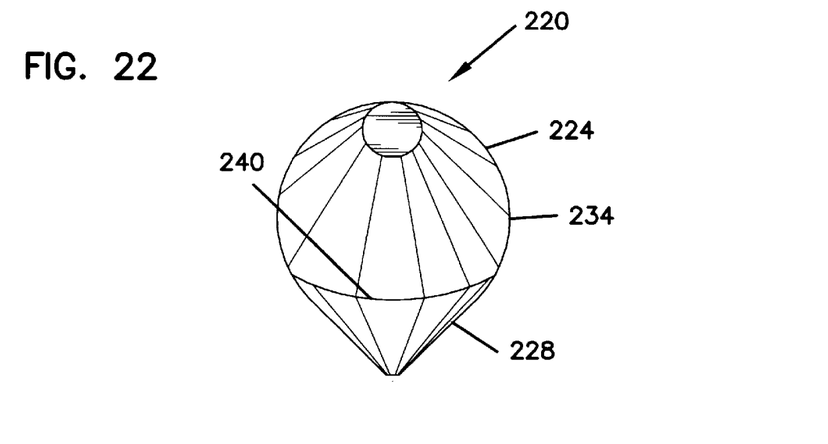
FIG. 22 is an end view of the second embodiment.
Figure 23:
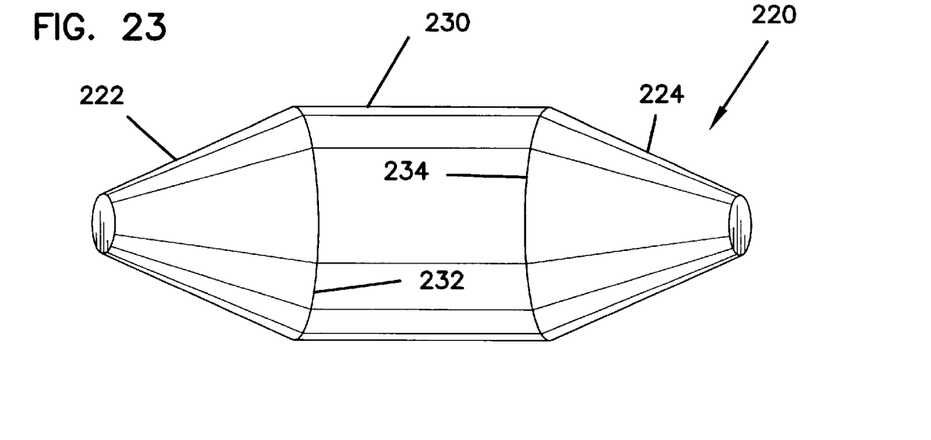
FIG. 23 is a top view of the second embodiment.

The embodiment of vessel 32 shown in FIGS. 1–20 includes three hoppers. Vessels with more or less hoppers are possible. FIG. 21 shows an embodiment of a two hopper vessel 220 including first and second end cones 222, 224, formed of a generally perfect conical shape. First and second hoppers 226, 228 and cylindrical section 230 combine to form enclosed vessel 220. Angled seam 232 and angled seam 234 form the intersections of first cone 222 and cylindrical section 230, and second cone 224 with cylindrical section 230. Third seam 236 forms the intersection of the two hoppers 226, 228 with cylindrical section 230. Fourth seam 238 forms the intersection between end cone 222 and hopper 226. Fifth seam 240 forms the intersection between second cone 224 and second hopper 228. Sixth seam 244 forms the intersection between first and second hoppers 226, 228.

Figure 24:
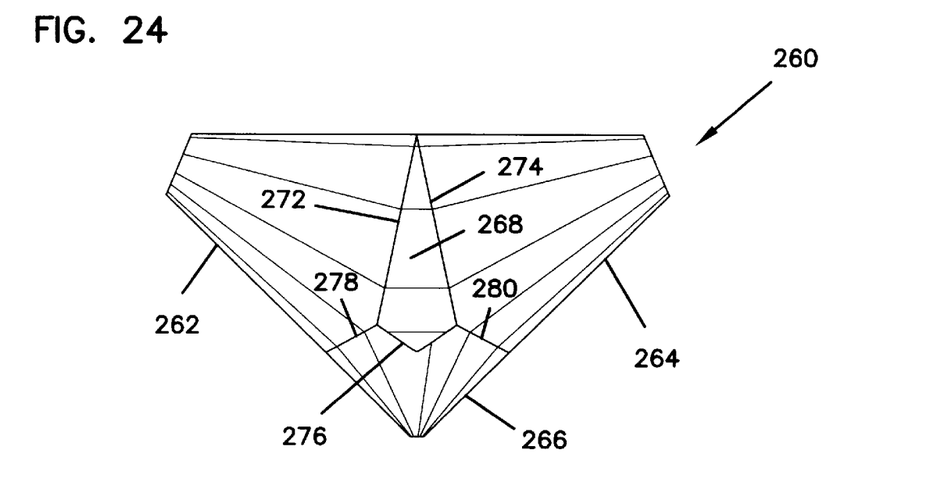
FIG. 24 is a side view of a third embodiment of a pneumatic vessel with a single hopper.
Figure 25:
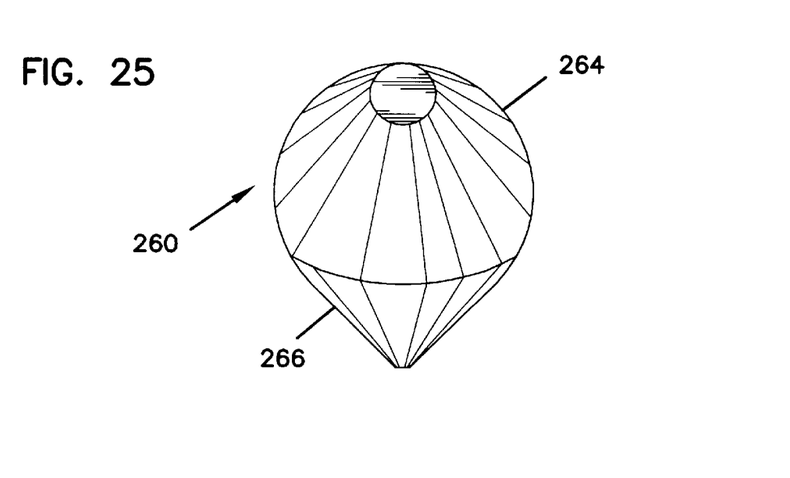
FIG. 25 is an end view of the third embodiment.
Figure 26:
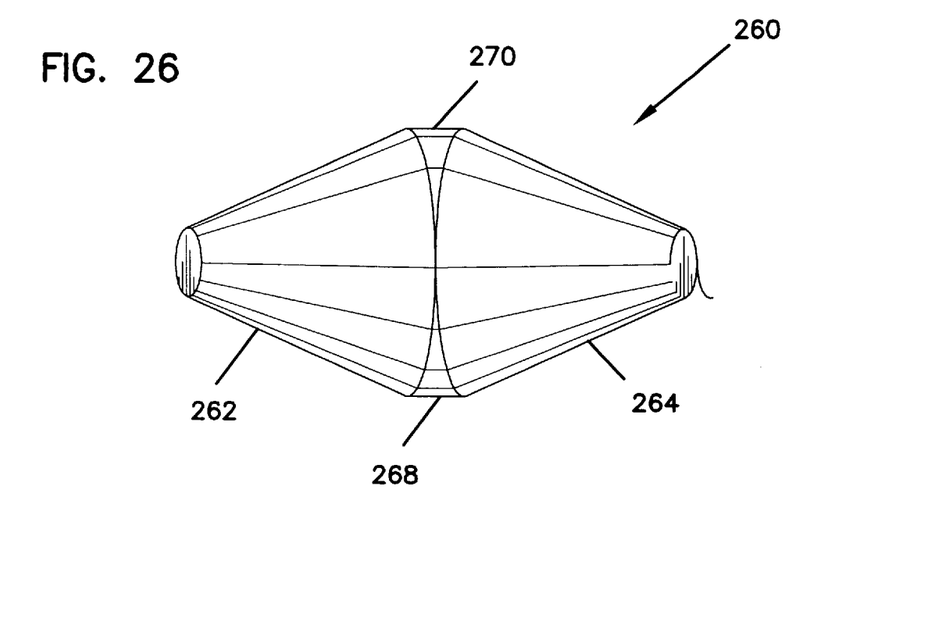
FIG. 26 is a top view of the third embodiment.

Referring now to FIGS. 24–26, an embodiment of a single hopper vessel 260 is shown including a single central hopper 266 and two end cones 262, 264. End cones 262, 264 are generally perfect conical shapes and are joined to cylindrical sections 268, 270 at first and second angled seams 272, 274, respectively. Third seam 276 joins hopper 266 to cylindrical sections 268, 270. Fourth seam 278 joins end cone 262 with hopper 266. Fifth seam 280 joins second end cone 264 with hopper 266.

Figure 27:
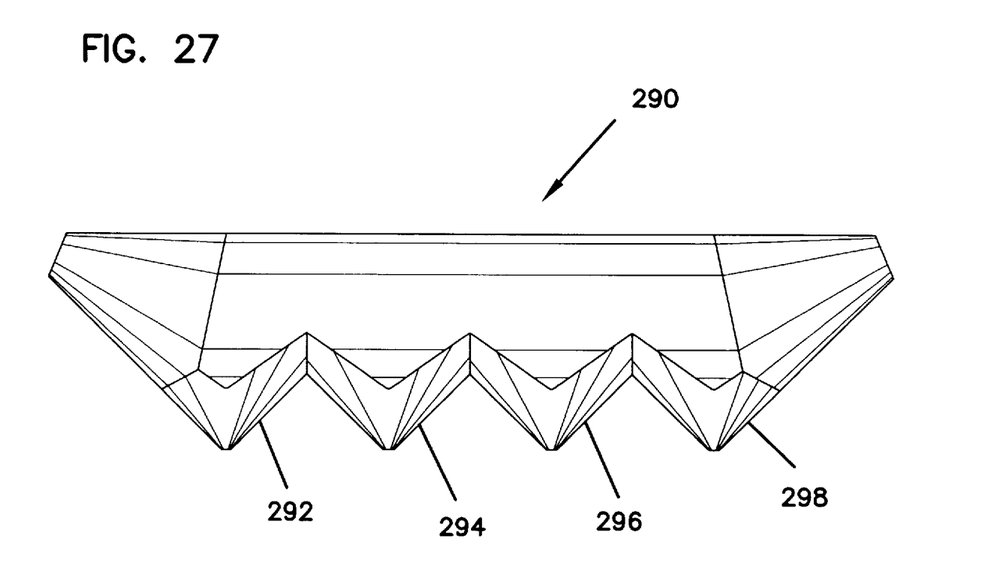
FIG. 27 is a side view of a fourth embodiment of a pneumatic vessel with four hoppers.

Referring now to FIG. 27, an embodiment of a four hopper vessel 290 is shown. Hoppers 292, 294, 296, and 298 form four unloading hoppers. Generally, the end cones are the same as three hopper vessel 32, and the cylindrical section is extended in the central region to accommodate a second middle hopper.

The present invention has been described in the foregoing specification. The embodiments are presented for illustrative purpose and are not to be interpreted as unduly limiting the scope of the invention. It is to be understood that modifications and alterations of the invention, especially in size and shape, will be apparent to those skilled in the art without departing from the spirit and scope of the invention.

What is claimed is:

1. A pneumatic vessel comprising:

a vessel wall of a metallic construction defining an enclosed shape with an interior for holding dry bulk material, the vessel wall including:

a top, a bottom, a first side, and an opposite facing second side;

a first end defining a conical shape having a first central axis;

an opposite second end defining a conical shape having a second central axis;

an upper central section defining a cylindrical shape, the upper central section forming at least a portion of the top of the vessel wall, the upper central section connecting the first end to the second end, the upper central section joined to the first end at a first seam, the upper central section joined to the second and at a second seam, the first and second seams each extending along the first and second sides of the vessel wall, each of the first and second seams defining a plane, each plane positioned at a non-perpendicular angle to the respective first and second central axes of the respective first and second ends defininig the conical shapes; and a lower central section defining at least one unloading hopper, the lower central section forming at least a portion of the bottom of the vessel wall, the lower central section connected to the upper central section, and the lower central section connecting the first end to the second end.

2. The pneumatic vessel of claim 1, wherein the lower central section includes an aeration system including at least one aerator positioned through the wall defining the lower central section.

3. The pneumatic vessel of claim 1, wherein the lower central section defines at least one conical shape.

4. The pneumatic vessel of claim 3, wherein the lower central section defines two conical shapes.

5. The pneumatic vessel of claim 3, wherein the lower central section defines three conical shapes.

6. The pneumatic vessel of claim 3, wherein the lower central section defines four conical shapes.

7. The pneumatic vessel of claim 1, wherein the lower central section includes an unloading system including at least one valve mounted to the wall defining the lower central section and a conduit extending from the valve.

8. The pneumatic vessel of claim 1, further comprising:
a frame supporting the vessel wall;
a chassis supporting the frame; and
wheels rotatably mounted to the chassis.

9. The pneumatic vessel of claim 1, further comprising at least one manhole extending from the upper central section of the vessel wall permitting access to the interior of the vessel wall.

10. The pneumatic vessel of claim 1, wherein the conical shapes defined by the first and second ends are 45° conical shapes.

11. The pneumatic vessel of claim 1, wherein the first end and the second end are made from rolled sheet metal.

12. A pneumatic vessel comprising:
a first conical wall at one end of the vessel, the first conical wall having a top surface portion and a bottom surface portion, the first conical wall defining a first central axis;
a second conical wall at an opposite end of the vessel, the second conical wall having a top surface portion and a bottom surface portion, the second conical wall defining a second central axis;

a cylindrical wall forming an upper portion of the vessel, the cylindrical wall having a top surface portion, the first conical wall and the second conical wall each joined directly to the cylindrical wall at an angled seam, wherein the top surface portion of each of the first and second conical walls and the top surface portion of the cylindrical wall extend collinear to one another and are parallel to a longitudinal axis of the vessel, and wherein the bottom surface portion of each of the first and second conical walls extends at an angle to the direction of extension of the top surface portions of the first and second conical walls and the top surface portions of the cylindrical wall, each angled seam defining a plane positioned at a non-perpendicular angle to the longitudinal axis of the vessel, the plane of each angled seam further positioned at a non-perpendicular angle to the respective first and second central axes of the respective first and second conical walls; and a lower hopper wall defining at least one unloading hopper, the lower hopper wall joined to the first and second conical walls and to the cylindrical wall wherein an enclosed vessel is formed.

13. The pneumatic vessel of claim 12, wherein the bottom surface portions of the conical walls extend at a 45° angle to the direction of extension of the top surface portions of the conical walls and the top surface portion of the cylindrical wall.

14. The pneumatic vessel of claim 12, wherein the unloading hopper includes an aeration system including at least one aerator positioned through the lower hopper wall.

15. The pneumatic vessel of claim 14, wherein the unloading hopper includes an unloading system including at least one valve mounted to the lower hopper wall and a conduit extending from the valve.

16. The pneumatic vessel of claim 15, further comprising at least one manhole extending from the upper portion of the vessel permitting access to the interior of the vessel.

17. The pneumatic vessel of claim 16, further comprising:
a frame supporting the vessel;
a chassis supporting the frame; and
wheels rotatably mounted to the chassis.

18. The pneumatic vessel of claim 12, wherein the first conical wall, the second conical wall, and the cylindrical wall are made from rolled sheet metal.

19. The pneumatic vessel of claim 12, wherein the lower hopper wall defines at least one conical shape.

20. The pneumatic vessel of claim 19, wherein the lower hopper wall defines two conical shapes.

21. The pneumatic vessel of claim 19, wherein the lower hopper wall defines three conical shapes.

22. The pneumatic vessel of claim 19, wherein the lower hopper wall defines four conical shapes.

* * * * *